(12) United States Patent
Dordick

(10) Patent No.: US 8,267,361 B1
(45) Date of Patent: Sep. 18, 2012

(54) ATTACHMENT TO A LONG LENS SUPPORT DEVICE WHICH FUNCTIONS AS BOTH A BALL HEAD AND A GIMBLE HEAD

(75) Inventor: Scott D. Dordick, Glendora, CA (US)

(73) Assignee: Acratech, Inc., Glendora, CA (US)

( * ) Notice: Subject to any disclaimer, the term of this patent is extended or adjusted under 35 U.S.C. 154(b) by 1047 days.

(21) Appl. No.: 11/975,304

(22) Filed: Oct. 18, 2007

(51) Int. Cl.
*F16M 11/02* (2006.01)

(52) U.S. Cl. ............... 248/181.1; 248/181.2; 248/178.1; 248/179.1; 248/288.31; 248/288.51; 396/419; 348/373; 348/376

(58) Field of Classification Search ............... 248/181.1, 248/181.2, 178.1, 179.1, 288.31, 288.51; 396/419–428; 348/373, 376
See application file for complete search history.

(56) References Cited

U.S. PATENT DOCUMENTS

| | | | |
|---|---|---|---|
| 848,469 A * | 3/1907 | Kohler | 108/8 |
| 875,034 A | 12/1907 | Wright | |
| 1,280,013 A | 9/1918 | Goddard | |
| 1,798,446 A * | 3/1931 | Zerk | 248/181.1 |
| 2,180,214 A * | 11/1939 | Rapp | 248/181.1 |
| 2,464,492 A * | 3/1949 | Dimick | 384/208 |
| 2,752,116 A | 6/1956 | Minnis | |
| 3,211,405 A * | 10/1965 | Fey et al. | 248/183.2 |
| 3,632,073 A | 1/1972 | Nakatani | |
| 3,737,130 A | 6/1973 | Shiraishi | |
| 3,747,884 A | 7/1973 | Steisslinger et al. | |
| 4,016,583 A | 4/1977 | Yeates | |
| 4,787,613 A | 11/1988 | Hayes | |
| 4,915,333 A | 4/1990 | Bolondi | |
| 4,974,802 A * | 12/1990 | Hendren | 248/181.1 |
| 5,072,907 A * | 12/1991 | Vogt | 248/181.1 |
| 5,279,488 A | 1/1994 | Fleming | |
| 538,534 A | 4/1995 | O'Neill | |
| 5,782,572 A * | 7/1998 | Thiem | 403/90 |
| 5,790,910 A | 8/1998 | Haskin | |
| 5,806,821 A | 9/1998 | Phillips et al. | |
| 5,871,186 A | 2/1999 | Bothe et al. | |
| 6,254,401 B1 | 7/2001 | Lee | |
| 6,352,228 B1 * | 3/2002 | Buerklin | 248/181.1 |
| 6,513,774 B2 * | 2/2003 | Hailson | 248/288.51 |
| 6,729,778 B1 | 5/2004 | Wu et al. | |
| 7,021,592 B2 | 4/2006 | Brandes | |
| 7,201,541 B2 * | 4/2007 | Barmann | 405/296 |
| 7,281,693 B2 * | 10/2007 | Chou | 248/181.1 |
| 7,387,284 B2 * | 6/2008 | Chang | 248/206.5 |
| 7,661,648 B2 * | 2/2010 | Lin | 248/683 |
| 2002/0179786 A1 | 12/2002 | Zheng | |
| 2005/0001116 A1 | 1/2005 | Vogt | |
| 2005/0045783 A1 * | 3/2005 | Brumley | 248/181.1 |

(Continued)

*Primary Examiner* — Terrell McKinnon
*Assistant Examiner* — Michael McDuffie
(74) *Attorney, Agent, or Firm* — Thomas I. Rozsa

(57) ABSTRACT

An attachment for a photographic instrument including a camera, comprising a transverse rotatable member having a top arcuate vertical support. A first top arcuate member is comprised of a gap and a second top arcuate member has an arcuate recess, wherein the top arcuate vertical support is connected to the respective first and second top arcuate member, which forms a seat as a housing of a universal joint. The universal joint is affixed to a shaft having a concentric bearing, which is further affixed to the camera mount, so that the camera mount can be rotated. A pin is affixed to the universal joint opposite to where the shaft is affixed. When the shaft having the bearing is downwardly and rotatably positioned inside of the recess, the pin is also upwardly positioned inside of the gap.

13 Claims, 9 Drawing Sheets

U.S. PATENT DOCUMENTS

| | | |
|---|---|---|
| 2006/0000957 A1 | 1/2006 | Carnevali |
| 2006/0024138 A1* | 2/2006 | Barmann ................ 405/288 |
| 2006/0175482 A1 | 8/2006 | Johnson |
| 2007/0090238 A1* | 4/2007 | Justis ................... 248/181.1 |
| 2007/0152115 A1* | 7/2007 | Chou ................... 248/181.1 |
| 2007/0152116 A1* | 7/2007 | Madsen ................ 248/181.1 |

* cited by examiner

ATTACHMENT TO A LONG LENS SUPPORT DEVICE WHICH FUNCTIONS AS BOTH A BALL HEAD AND A GIMBLE HEAD

BACKGROUND OF THE INVENTION

1. Field of the Invention

The present invention is related to an attachment for supporting a photographic instrument including a camera and a camera lens.

2. Description of the Prior Art

Camera attachments are known. The following 24 patents and published patent applications are the closest prior art references which are related to the present invention.

1. U.S. Pat. No. 538,534 issued to John W. O'Neill on Apr. 30, 1895 for "Book Holder" (hereafter the O'Neill Patent");
2. U.S. Pat. No. 875,034 issued to Emmet R. Wright on Dec. 31, 1907 for "Tripod Head" (hereafter the "Wright Patent");
3. U.S. Pat. No. 1,280,013 issued to Joseph Goddard on Sep. 24, 1918 for "Camera Mounting" (hereafter the "Goddard Patent");
4. U.S. Pat. No. 2,180,214 issued to Charles Rapp on Nov. 14, 1939 for "Universal Head" (hereafter the "Rapp Patent");
5. U.S. Pat. No. 2,752,116 issued to Luther W. Minnis on Jun. 26, 1956 for "Camera Supporting Heads for Tripods Or The Like" (hereafter the "Minnis Patent");
6. U.S. Pat. No. 3,632,073 issued to Koma Nakatani on Jan. 4, 1972 for "Tripod" (hereafter the "Nakatani Patent");
7. U.S. Pat. No. 3,737,130 issued to Yuki Shiraishi and assigned to Slick Tripod Co., Ltd. on Jun. 5, 1973 for "Hydraulically Operated Tripod Head" (hereafter the "Shiraishi Patent");
8. U.S. Pat. No. 3,747,884 issued to Kurt Steisslinger et al. and assigned to Eastman Kodak Company on Jul. 24, 1973 for "Stand For Photographic Apparatus" (hereafter the "Steisslinger Patent");
9. U.S. Pat. No. 4,016,583 issued to Calvin B. Yeates on Apr. 5, 1977 for "Camera Steadying Device" (hereafter the "Yeates Patent");
10. U.S. Pat. No. 4,787,613 issued to Michael Hayes on Nov. 29, 1988 for "Camera Repair And Support Device" (hereafter the "Hayes Patent");
11. U.S. Pat. No. 4,915,333 issued to Ivano Bolondi on Apr. 10, 1990 for "Easily Orientable Support For Optical And Photographic Instruments And The Like" (hereafter the "Bolondi Patent");
12. U.S. Pat. No. 5,279,488 issued to James Fleming on Jan. 18, 1994 for "Adjustable Workstation For Vehicles" (hereafter the "Fleming Patent");
13. U.S. Pat. No. 5,790,910 issued to Igor Haskin and assigned to Peerless Industries, Inc. on Aug. 4, 1998 for "Camera Mounting Apparatus" (hereafter the "Haskin Patent");
14. U.S. Pat. No. 5,806,821 issued to Edward Phillips et al. and assigned to Matthews Studio Equipment, Inc. on Sep. 15, 1998 for "Positionable Support Head" (hereafter the "Phillips Patent");
15. U.S. Pat. No. 5,871,186 issued to Klaus Bothe et al. and assigned to Klaus Bothe et al. on Feb. 16, 1999 for "Support Device" (hereafter the "Bothe Patent");
16. U.S. Pat. No. 6,254,044 issued to Li-Hwa Lee on Jul. 3, 2001 for "Tabletop Tripod" (hereafter the "Lee Patent");
17. U.S. Pat. No. 6,352,228 issued to Werner Buerklin and assigned to FLM GmbH Foto-, Licht-und Messtechnisches Zubehor on Mar. 5, 2002 for "Tripod Head" (hereafter the "Buerklin Patent");
18. United States Published Patent Application No. 2002/0179786 issued to Wei Jie Zheng on Dec. 5, 2002 for "ZWJ-Angle-Adjustment" (hereafter the "Zheng Published Patent Application");
19. U.S. Pat. No. 6,513,774 issued to Michael J. Hailson on Feb. 4, 2003 for "Adjustable Mounting Apparatus" (hereafter the "Hailson Patent");
20. U.S. Pat. No. 6,729,778 issued to Shing Ming Wu et al. on May 4, 2004 for "Fixture For Fixing Camera And The Likes Capable Of Adjusting The Pitching Angle Of The Camera" (hereafter the "Wu Patent");
21. United States Published Patent Application No. 2005/0001116 issued to Phillippe Vogt on Jan. 6, 2005 for "Tripod Head" (hereafter the "Vogt Published Patent Application");
22. United States Published Patent Application No. 2006/0000957 issued to Jeffrey D. Carnevali on Jan. 5, 2006 for "Universally Positionable Mounting Apparatus" (hereafter the "Carnevali Published Patent Application");
23. U.S. Pat. No. 7,021,592 issued to Raymond V. Brandes on Apr. 4, 2006 for "Quick-Adjusting Mounting Head" (hereafter the "Brandes Patent"); and
24. United States Published Patent Application No. 2006/0175482 issued to Joseph Johnson on Aug. 10, 2006 for "Tripod Head" (hereafter the "Johnson Published Patent Application").

The O'Neill Patent is for a book holder which discloses the concept of having a round surface entirely surrounding a spherical ball which can be rotated in any direction and that includes the altitude direction.

The Wright Patent discloses a tripod head that enables the camera to be articulated in any orientation. The tripod head includes having a ball bearing at the bottom with a tightening knob that enables the bearing to be rotated in any orientation so that the camera can be rotated.

The Goddard Patent discloses the concept of having a surrounding plate having U-shaped receiving openings in which the stem of the ball bearing can be received and affixed by a tightening screw.

The Rapp Patent discloses a clamping member which includes a notch so that a spherical head can be rotated so that a shaft affixed to the spherical head can be positioned within the notch.

The Minnis Patent discloses the concept of having a spherical ball which is surrounded by a tubular member having slots to receive a shaft from the spherical ball. There are four shafts spaced 90 degrees apart.

The Nakatani Patent discloses the concept of having a spherical body which supports a threaded rod to which a camera is attached and having a u-shaped slot surrounding an outer housing in which the spherical body is positioned so that it can be rotated to the horizontal position.

The Shiraishi Patent is a hydraulically operated tripod head. It discloses a cylindrical ball and a shaft used to support a camera and the fact that it can be rotated in any orientation including into the horizontal u-shaped slot so that the camera can be orientated in different directions.

The Steisslinger Patent is essentially a stand for photographic equipment and basically again has the concept of a ball bearing and a shaft extending therefrom with the ball bearing being rotatable into the housing when not in use and then rotatable to the elevated position.

The Yeates Patent discloses a concept of having a ball bearing so that a camera can be rotated in any orientation relative to the tripod by rotation of the ball bearing.

The Hayes Patent is once again disclosing a ball bearing used to orient a camera in different orientations.

The Bolondi Patent discloses a device for being able to orient the camera in different orientations.

The Fleming Patent is an adjustable workstation for vehicles. While not related to cameras, it contains a ball and socket arrangement. Specifically, the patent states: "Referring still to FIG. 3, the adjustability of the present invention is further enhanced by a ball-and-socket joint 20 which includes a ball portion 68 extending integrally from a stem 70 adapted to be directly coupled to the working surface 16. The socket portion 72 is fixedly secured to the extension portion 58 by means of a threaded pin 78. The ball portion 60 is held inside the joint 20 by means of a socket portion 72 over which a movable cover 74 is positioned. A clamp screw 76 is threaded through the cover 74 to engage a partially spherical exterior surface of the socket portion 72. The ball-and-socket joint 20 allows the working surface to be positioned in any number of orientations by allowing the stem 70 to be moved about an entire semi-spherical area within aperture 80 of the cover 74."

The Haskin Patent is also a camera mounting apparatus which includes the concept of a ball bearing being able to rotate the security camera in various orientations due to a ball bearing structure.

The Phillips Patent discloses a ball bearing surface for positing the orientation of a camera which has in its unique features including a multiplicity of threads on the ball so that it increases the frictional force fit within its mating member.

The Bothe Patent discloses a support device for a camera. As with the other inventions, a holder of the support device is connected to a stand by a ball and socket joint with a socket constructed as a bridge. The bridge has a width which is narrower than the diameter of the ball and socket joint.

The Lee Patent discloses a tabletop tripod which once again has a spherical ball bearing as its rotatable surface. It also has slots surrounding the ball bearing so that the ball bearing can be rotated to various horizontal orientations. In this patent, the ball is fixedly connected to an equipment base and is mounted between concave faces of compression blocks such that the equipment base can be adjusted to virtually any desired position.

The Buerklin Patent discloses a tripod head having a cylindrical ball bearing for the purpose of orienting the tripod head in any orientation so that a threaded shaft attached to the ball bearing can orient a camera in any desired location.

The Zheng Patent Application has the concept of having a rotatable ball bearing with an adjustment threaded nut that presses against a ball bearing in order to orient the angle of the shaft to which the ball bearing is attached to any desired angle.

The Hailson Patent discloses an adjustable mounting apparatus for a camera which in this case has a ball wherein the orientation is determined by two clamping members on either side of the ball which lock the ball to a given orientation when the clamping members are fixed about the ball at a desired position.

The Wu Patent is a fixture for fixing a camera in an adjustable manner which contains a ball bearing with its own unique features for locking it in a given orientation.

The Vogt Published Patent Application discloses a tripod head that includes a cylindrical housing having a connection member at one end for a tripod, a ball joint rotatably and pivotally arranged in the housing, a bearing element for the ball joint, having a sliding surface contacting the circumference of the ball joint and arranged so as to be axially displaceable and rotatable in the housing, and a device for fixing the ball joint and having a support for the bearing element and an adjusting device in operative connection with the support in order to displace the bearing element against the ball joint to achieve the clamping action.

The Carnevali Patent Application discloses a mounting device. It has the innovations of: "The stem 210 is provided with an internally threaded longitudinal bore 212 that is structured to engage the threaded rod 206. An outer end of the stem adjacent to the threaded bore 212 is formed with a hex shaped lip 214 sized to received into and mate with the hexagonal counter-bore 51 at the center of the boss or land 49 surrounding the aperture 47 formed through either one of the respective arm sections 7,9. The stem 210 is thus provided with means for fixing the ball-end mount 208 against rotation relative to the respective arm sections 7,9 during threading and unthreading of the threaded knob 65 in operation."

The Brandes Patent is a mounting head for a spotting scope which discloses the ball-bearing concept.

Finally, the Johnson Published Patent Application is a tripod head which discloses a ball bearing and its ability to rotate in various directions. In the tripod of this invention, the ball member is generally a spherical ball having an extension for connecting to a locking device and the locking device normally consists essentially of a split clamp having a recess adapted to mate with a plate attached to the optical instrument and a clamp is used for securing the ball in place in the housing.

There is a significant need to provide an attachment to a camera, particularly for camera equipped with a long lens so that the camera can be supported to any positions in three dimensional space.

SUMMARY OF THE INVENTION

The present invention is an attachment for a photographic instrument including a camera. The attachment is comprised of a base structural section, an upper section and a rotatable section. The base section includes a bottom base which is concentrically and rotatably connected to a transverse rotatable member having a top arcuate vertical support.

The upper structural section is comprised of a first top arcuate member which is affixed to a friction reduction member having a gap at its bottom side and a second top arcuate member which is affixed to an upper and a lower friction reduction member. The top arcuate vertical support of the transverse rotatable member is connected to the respective first and second top arcuate member, which forms a seat as a housing for a universal joint, wherein the size of the seat is adjustable through two fasteners so that rotation of the universal joint can be prevented if the seat size is reduced. The universal joint is affixed to an end of a shaft aligned with a diameter of the universal joint, wherein a bearing is concentrically affixed to the shaft. The shaft at its opposite end is affixed to a mount where the photographic instrument is connected. In addition, a pin is affixed to the universal joint at a place which is opposite to where the shaft is affixed. Therefore, the rotatable section is comprised of the universal joint, the shaft, the pin, and the camera mount.

The second top arcuate member is further comprised of an arcuate recess which is aligned with the "X" axis of the three dimensional space. When the shaft having the bearing is downwardly and rotatably positioned inside of the recess, the pin is also upwardly positioned inside of the gap of the friction reduction member attached to the first top arcuate member, wherein the gap prevents the pin from having a further upward movement. Therefore, the present invention constructs a leverage wherein the bearing functions as a rotational support. The gap of the pin provides a force at the pin, which functions as one end of the leverage, to balance a weight of a camera having a long lens with tripod collar which is attached to the camera mount, wherein the weight of the camera is applied to the camera mount functioning as the opposite end of the leverage. Therefore, without tightening the seat of the universal joint, the present invention camera attachment enables the camera to freely rotate around the "X" axis, while keeping the camera position balanced. The bearing of the present invention further contributes a smooth rotation of the camera.

In addition, the present invention including the shaft which has a sufficient length enables the camera mount to be rotatably positioned above the top arcuate vertical support for aligning with the "Z" axis of the space. Therefore the camera which is attached to the mount can be freely rotated to any angular position of the three dimensional space, including the highest attitude position.

It is therefore an object of the present invention to provide an innovative attachment for a photographic instrument including a camera, so that the innovative attachment is advantageous for having a simple structure and a better function, as compared with conventional attachments having a separated gimble head and ball head.

It is also an object of the present invention to provide a transverse rotatable member having a top arcuate vertical support, a first top arcuate member which is affixed to a friction reduction member having a gap at its bottom side and a second top member having an arcuate recess which is affixed to an upper and a lower friction reduction member, wherein the top arcuate vertical support of the transverse rotatable member is connected to the respective first and second top arcuate member, so that it forms a seat as a housing of a universal joint of the present invention, wherein the size of the seat is adjustable through adjusting two fasteners, therefore rotation of the universal joint can be prevented if the seat size is reduced.

It is an additional object of the present invention to provide a universal joint which is affixed to an end of a shaft having a concentric bearing aligned with a diameter of the universal joint, wherein the shaft at its opposite end is affixed to a mount where the photographic instrument is connected. In addition, a pin is affixed to the universal joint at a location which is opposite to where the shaft is affixed, so that a leverage is created, wherein the pin functions as one end of the leverage, the bearing functions as a rotation support and the camera mount functions as the opposite end of the leverage.

It is a further object of the present invention to provide a structural mechanism wherein the shaft having the concentric bearing is enabled to be downwardly and rotatably positioned inside of the recess and concurrently the pin is also upwardly positioned inside of the gap of the friction reduction member attached to the first top arcuate member, where the gap provides a force against the pin for preventing the pin from having a further upward movement, so that the force balances a weight of a camera having a long lens with tripod collar attached to the camera mount, wherein the weight of the camera is applied to the camera mount which functions as the opposite end of the leverage. Therefore, without reducing a size of the seat of the universal joint, the present invention camera attachment can make the camera freely rotate around the horizontal axis, while keeping the camera position balanced.

It is another object of the present invention to provide a bearing which is concentrically affixed to the shaft, so that it can provide a smooth rotation of the shaft when the shaft is positioned inside of the arcuate recess of the attachment, and is further aligned with the horizontal axis.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
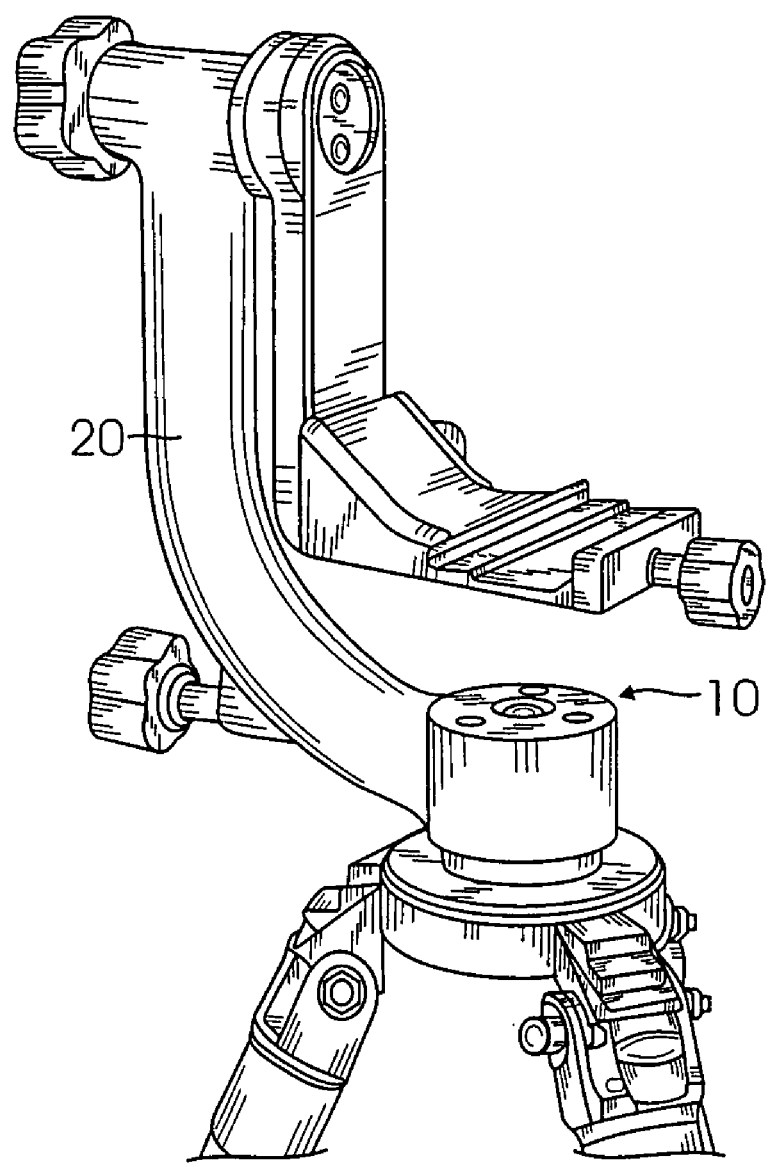
FIG. 1 is a perspective view of a prior art camera attachment.
Figure 2:
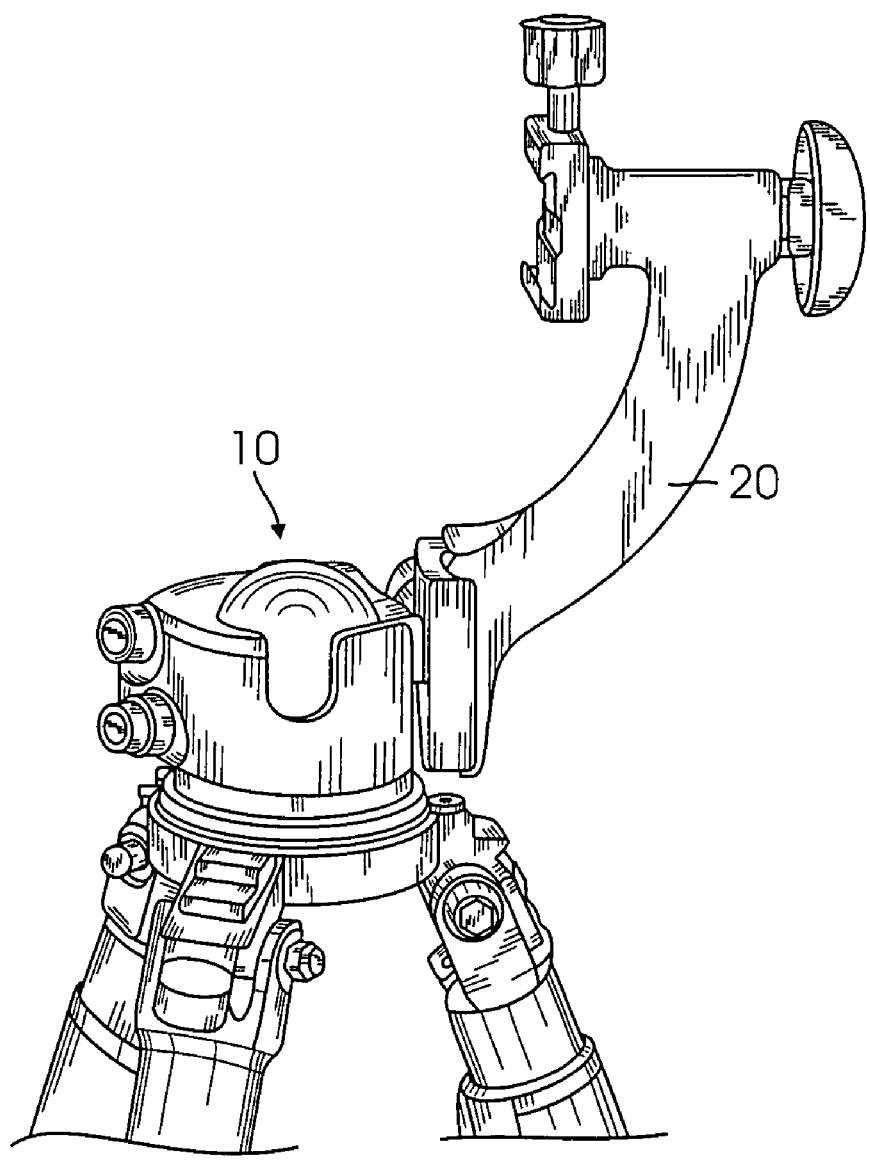
FIG. 2 is a perspective view of another prior art camera attachment.
Figure 3:
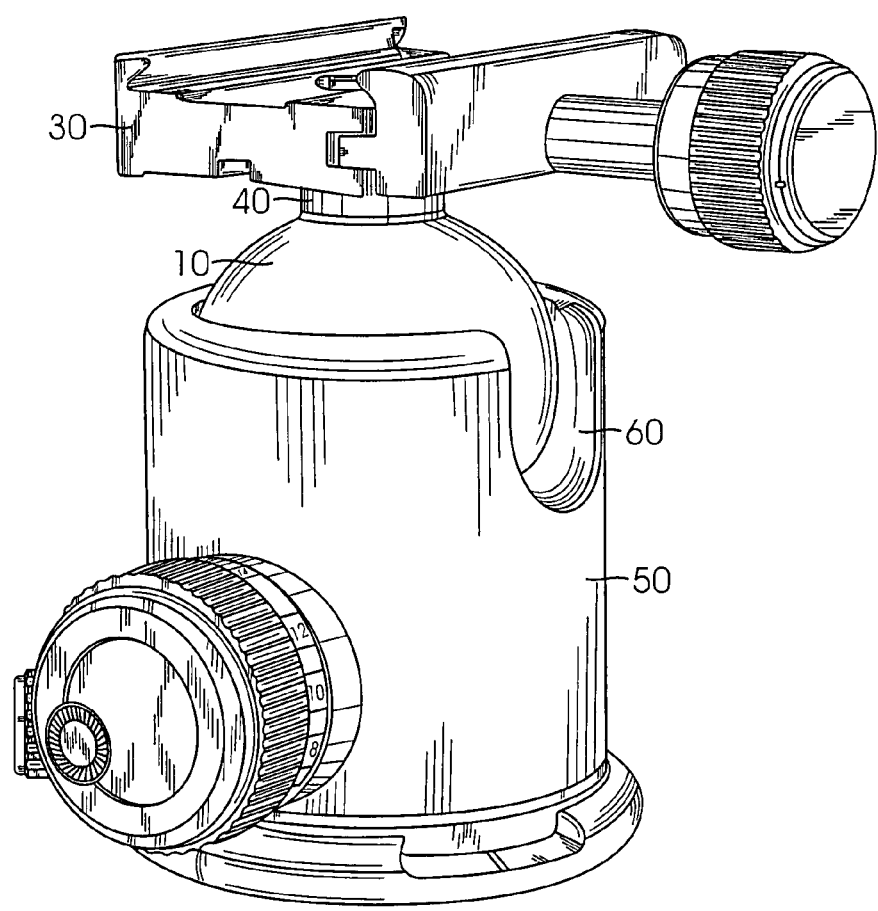
FIG. 3 is a perspective view of a conventional ball head for a prior art camera attachment.

It is well known that a camera attachment having traditional ball head designs works well for cameras which are equipped with various types of regular short lenses. However, the traditional ball head designs have difficulties when attempting to control positions in a three-dimensional space for cameras equipped with longer lenses with a tripod collar. For resolving the difficulties, various camera attachments have been invented. Referring to FIGS. 1 and 2, there are illustrated two conventional designs of the camera attachments known in the prior art. As illustrated, it is necessary for the conventional designs of the camera attachment to carry a separate gimble head or gimble attachment 20 affixed to a ball head 10, where the design of the conventional ball head 10 is illustrated in FIG. 3.

The conventional ball head 10 includes an outer casing 50 which has therein a circumferential groove 60. The ball head 10 is connected to a short shaft 40 which at the opposite end of the shaft is attached to a camera mount 30. Therefore, the ball head 10 can be rotated downwardly to where the short shaft 40 is positioned into the circumferential groove 60. As illustrated, the traditional ball head designs cannot freely control positions of the cameras equipped with the longer lenses. Therefore, a significant improvement is needed for a camera attachment, so that the innovative attachment will have capabilities which are superior to the combined advantages from the conventional ball head which is combined with the gimble attachment.

Figure 4:
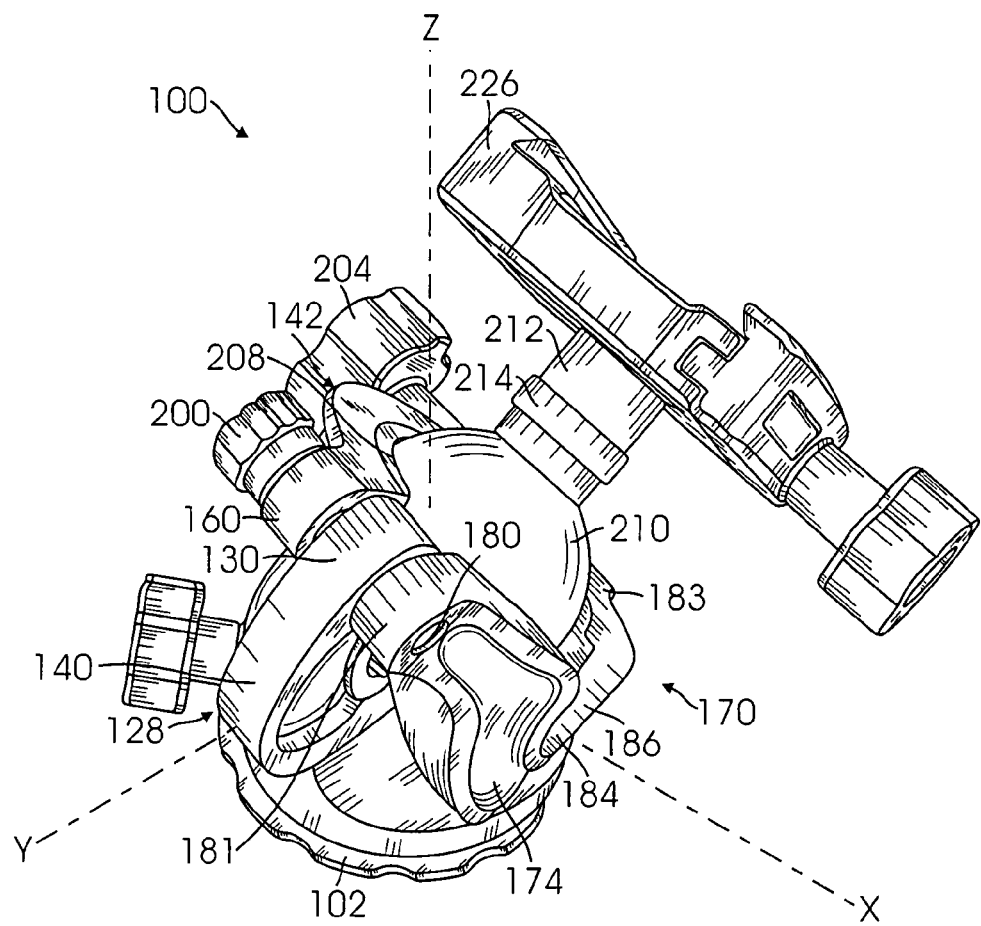
FIG. 4 is a perspective view of a preferred embodiment of a camera attachment of the present invention, wherein the perspective view is taken when viewed from a top of the attachment to align with a rotational axis of a base of the attachment, wherein the rotational axis is further aligned with the Z" axis of the three dimensional space, a top vertical arcuate member of the attachment is positioned in the "YZ" plane, and an arcuate recess of the attachment is aligned with the "X" axis.
Figure 5:
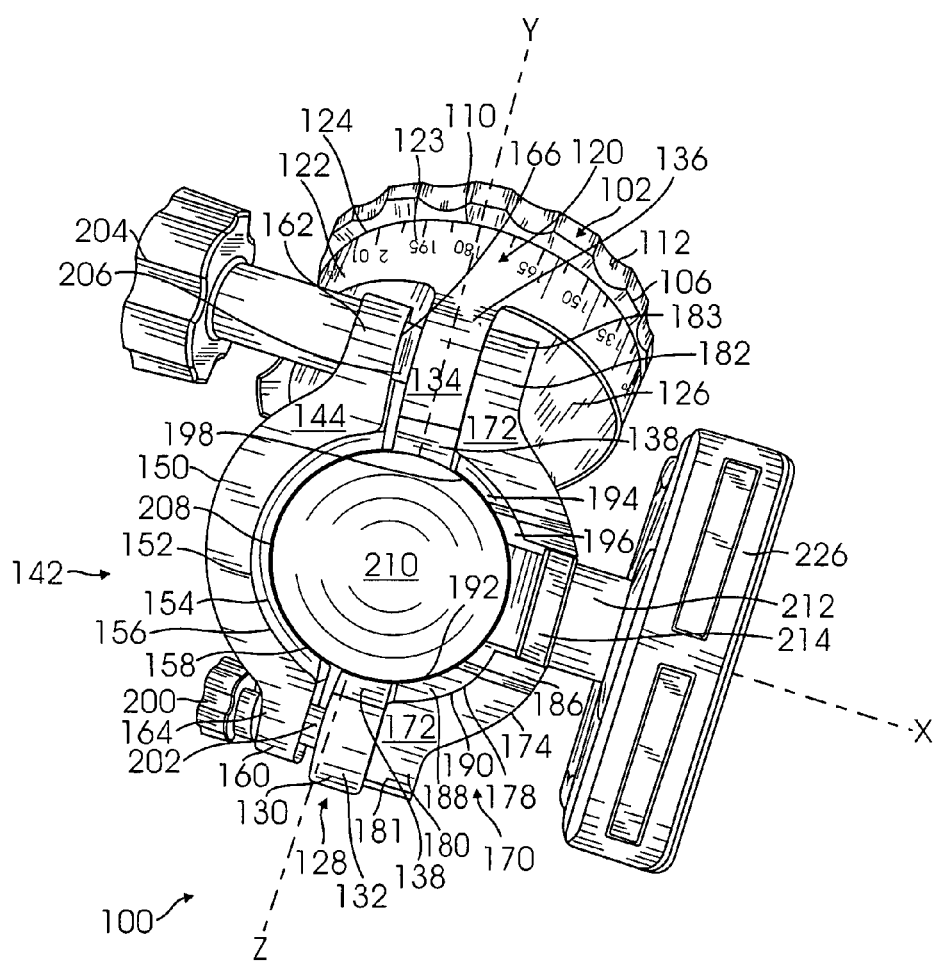
FIG. 5 is a perspective view of the preferred embodiment of the camera attachment of the present invention, wherein the perspective view illustrates that a shaft of a ball head is positioned into the arcuate recess of the present invention, and the shaft is aligned with the "X" axis of the three dimensional space.
Figure 6:
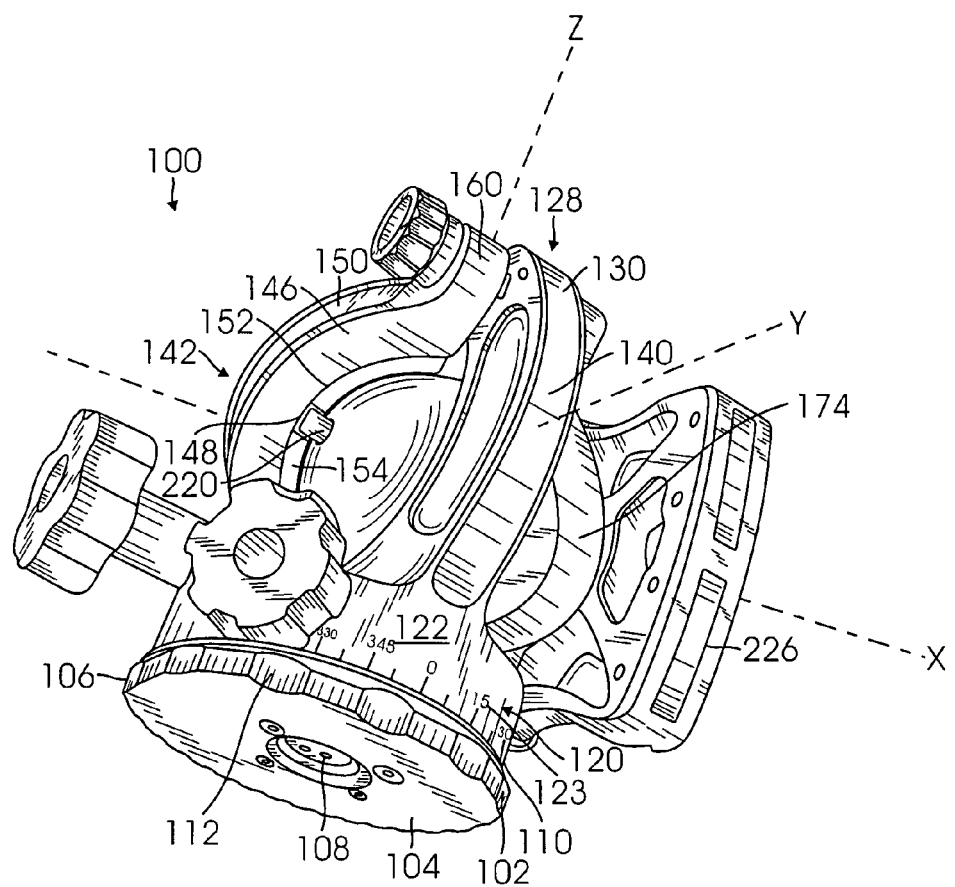
FIG. 6 is a perspective view of the preferred embodiment of the camera attachment of the present invention, wherein the perspective view is taken from the center of a bottom of the base of the attachment to align with a top vertical arcuate member of the attachment.

Referring to FIGS. 4 to 6, there is illustrated a preferred embodiment of the present invention attachment 100 to a photographic instrument such as a camera which is equipped with a long lens having a tripod collar. The structure of the attachment 100 is comprised of a base section, an upper section to form a seat for a universal joint 210 such as a ball head, and a rotatable section including the universal joint.

As best illustrated in FIGS. 5 and 6, the base section of the present invention camera attachment 100 is comprised of a bottom round base 102 and a transverse rotatable round member 120 having a top vertical arcuate support 128. The bottom round base 102 is comprised of a bottom side 104, a top side 110, and an outer cylindrical side 106 containing a plurality of indentations 112 to enhance the ability to grab and turn the bottom round base. In addition, a threaded bore 108 is positioned at the center of the bottom surface 104, which is used for connecting the attachment 100 to a camera telescoping rod support.

The transverse rotatable round member 120 is comprised of a round top side 126, and a round bottom side 124, and an outer cylindrical side 122 having a multiplicity of annular number markings 123. It will be appreciated that the bottom side 124 of the transverse rotatable round member 120 matches the top side 110 of the bottom base 102. Therefore, the bottom base 102 and the transverse rotatable round member 120 can be concentrically assembled together, so that the transverse rotatable member 120 can be freely rotated around the center of the bottom base 102, where the base 102 is firmly connected to the camera telescoping tripod support.

As best illustrated in FIGS. 4 and 6, a top arcuate vertical support 128 is affixed onto the top side 126 of the transverse rotatable member. The top arcuate vertical support 128 is a piece of the arcuate shaped structure, comprising an upper end 130 and a lower end 134, wherein a concave shaped inner surface 138 and a convex shaped outer surface 140 are connected between the upper and lower ends 130 and 134. As further illustrated, the lower end 134 of the top arcuate vertical support 128 is connected to a top edge of the outer cylindrical side 122 of the transverse rotatable member 120. The affixation is extended where a lower part of the outer convex surface 140 is merged into the top side 126 of the transverse rotatable member 120. In this configuration, a projection of the upper end 130 and lower end 134 which are bridged by the inner surface 138 is aligned with a diameter of the top round surface 126.

In the following discussion, certain members such as 142 and 128 are described as being arcuate. It will be appreciated that it is within the spirit and scope of the present invention for the members to also be rectangular or cylindrical.

Referring to FIGS. 4 to 6, the upper section is illustrated to comprise a first top arcuate member 142 with a friction reduction member 154 and second top arcuate member 170 with an upper and a lower friction reduction member 188 and 194. The upper section of the structure, which is combined with the top vertical arcuate support 128, forms a seat 208 as a housing of the universal joint 210 of the present invention.

The first top arcuate member 142, which is a structure shaped like a half hollow cylindrical disc, is comprised of a top surface 144 which is in parallel to a bottom surface 146, an upper end 160 and a lower end 162. As best illustrated in FIG. 5, the upper and lower surface 144 and 146 have a U-shape. The first arcuate support member 142 is further comprised of a convex shaped outer surface 150 when viewed from the outer surface along a direction from outside towards the outer surface 150, and a concave shaped inner surface 152 when viewed from the inner surface inwardly towards it. In addition, there is a bore 164 which is positioned on the upper end 160 to align with the hole (not shown) of the upper end 130 of the top arcuate vertical support 128. Similarly, there is another bore 166 which is positioned on the lower end 162 of the first top arcuate member 142 to align with the hole (not shown) of the lower end 134 of the top arcuate vertical support 128.

Referring to FIG. 5, there is illustrated friction reduction member 154 which is inwardly affixed to the first top arcuate member 142 for controlling rotation of the universal joint 210. The friction reduction member 154 is comprised of an outer surface 156 and inner surface 158, wherein the outer surface 156 matches the inner surface 152 of the first top arcuate member 142, and the inner surface 158 matches the spherical characteristics of the universal joint 210. Furthermore, as illustrated in FIG. 6, a gap 148 which is specifically designed for the present invention is positioned on a middle of a bottom side of the friction reduction member 154.

As illustrated in FIGS. 4 and 5, the second top arcuate member 170 is generally a piece of arcuate structure having an upper end 181, a lower end 183, a convex shaped outer surface 174 when viewed from the outer surface along a direction from outside to the outer surface, and a concave shaped inner surface 178 when viewed from the inner surface inwardly towards it. In addition, an arcuate recess 184 having a top arcuate surface 186 is connected to the respective upper and lower end 181 and 183, so that a top side of the second top arcuate member 170 is separated by the arcuate recess 184 to form two top sectional sides 172. Referring particularly to FIG. 5, there is illustrated that the overall shape of the two top sectional sides 172 is generally symmetric relative to the U shaped top surface 144 of the first top arcuate member 142. As best illustrated in FIG. 4, the convex shaped outer surface 174 also has a U-shape due to the presence of the arcuate recess 184. In addition, the second top arcuate member 170 is illustrated to further comprise a threaded bore 180 which is positioned on the upper end 181 to align with the hole 132 of the upper end 138 of the top arcuate vertical support 128. Similarly, as illustrated in FIG. 4, a threaded bore (not shown) is positioned on the lower end 183 to align with the hole of the lower end 134 of the top arcuate vertical support 128.

Referring to FIG. 5, there is illustrated upper and lower friction reduction member 188 and 194 for the universal joint 210. The upper friction reduction member 188 is positioned adjacent the upper end 181 of the second top arcuate member 170, comprising an outer surface 190 and inner surface 192. The outer surface 190 of the upper friction reduction member 188 matches the inner surface 178 of the second top arcuate member 170, and the inner surface 192 matches the spherical characteristics of the universal joint 210. Similarly, the lower friction reduction member 194 is positioned adjacent the lower end 183 of the second top arcuate member 170. The lower friction reduction member 194 is comprised of an inner surface 196 and outer surface 198, wherein the inner surface 196 matches the inner surface 178 of the second top arcuate member 170, and the outer surface 198 matches the spherical characteristics of the universal joint 210.

It will be appreciated that the seat 208 which serves as the housing for the universal joint 210 is created after affixing the first top arcuate member 142 with the friction reduction member 154 and second top arcuate member 170 with the upper and lower friction reduction members 188 and 194 to the top arcuate vertical support 128, wherein the affixation is through application of an upper fastener 200 having a threaded body 202 such as a threaded bolt and a lower fastener 204 having a threaded body 206. As best illustrated in FIG. 5, the threaded body 202 of the upper fastener 200 is inserted through the upper bore 164 of the first top arcuate member 142 and the upper bore 132 of the top arcuate vertical support 128 to threadedly connect to the upper threaded bore 180 of the second top arcuate member 170. Similarly, the lower fastener 204 is connected to the threaded bore 182 of the second top arcuate member 170 from penetrating through the lower bore 166 of the first top arcuate member 142 and the lower bore 136 of the top arcuate vertical support 128 of the transverse rotatable member 120. With such configuration, a size of the seat 208 can be adjusted, wherein the size of the seat 208 is increased when loosening the fasteners 200 and 202. The size of the seat 208 is decreased when tightening the fasteners. Therefore, the rotational movement of the universal joint 208 can be controlled by tightening or loosening the fasteners.

Figure 7:
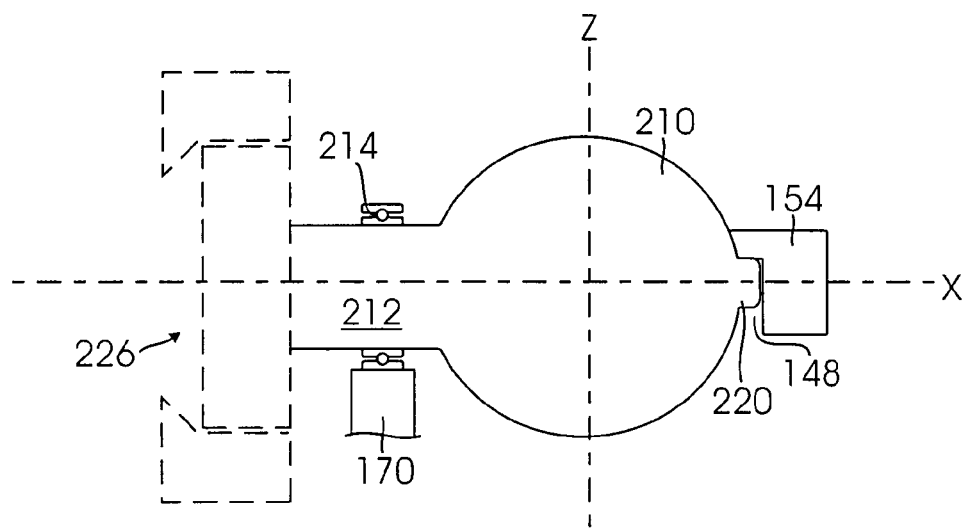
FIG. 7 is a schematic illustration of the present invention attachment having the shaft which is extended from a universal joint and is further aligned with a diameter of the universal joint. A pin is placed at a position which is opposite to the location where the shaft is positioned. In addition, the pin is illustrated to be positioned into a gap of a friction reduction member of the present invention.

Referring to FIGS. 4 to 6, the rotatable section of the present invention camera attachment is illustrated to comprise the universal joint 210, a pin 220, a shaft 212, a bearing 214 and a camera mount 226. As illustrated in FIG. 4, the shaft 212 at one end is connected to the universal joint 210 such as the ball head, and at opposite end is connected to the camera mount 226 which is positioned transverse to the shaft 212, wherein the shaft is aligned with a diameter of the ball head. The shaft 212 is further illustrated to concentrically comprise the bearing 214. It will be appreciated that, from the spirit and scope of the present invention, any types of the bearings including rollers, or even solid rings made of a low friction material are appropriate, so long as those structures provide rotation means. Referring to FIGS. 6 and 7, there is illustrated the pin 220 of the present invention. The pin 220 is connected to the ball head 210, wherein the connection takes place at a place which is aligned with the shaft 212 but at the opposite side of the ball head, as compared with the place of the ball head 210 where the shaft 212 is connected.

While the components of the present invention have been described in great detail, in essence the present invention is an apparatus to rotatably attach photographic equipment, comprising: (a) a ball head to rotatably support photographic equipment, the ball head rotatably supported in a casing having an exterior support base containing a groove therein; (b) the ball head including a shaft extending at one end from the ball head and terminating at a second end at a photographic support mount; (c) a rotatable bearing means on said shaft and located so that the bearing means is aligned with the groove when the ball head is rotated to enable the shaft to be positioned within the groove; and (d) the ball head having a restraining pin affixed at a location on the ball head opposite to and aligned with the shaft, the restraining pin received within a receiving means on a lower surface of the casing. By way of example, the bearing means is a ball bearing. However, it is within the spirit and scope of the present invention for the bearing means to be any type of bearing, including a roller bearing, a plane bearing, or even a plastic bushing for reducing the friction force when the camera mount is rotating.

The essence of the present invention is the incorporation of the bearing means into the shaft to permit fluid rotation in one axis and the incorporation of the restraining pin to prevent excessive movement in a perpendicular axis, to thereby enable the device to support heavy photographic equipment such as a camera with a very long lens.

The apparatus wherein the bearing means permits the shaft and photographic equipment to be rotated in one axis and the restraining pin prevents further movement of the shaft in another axis thereby facilitates a leverage support structure to support heavy photographic equipment.

It will be appreciated that the present invention camera attachment 100 significantly simplifies the structure of the conventional camera attachment having the separate ball head 10 and the gimble head 20 as illustrated in FIGS. 1-3. In addition to its simplified structure, the present invention achieves a better performance to control a position in the three dimensional space for a camera equipped with a long lens with a tripod collar, particularly for the camera which is positioned aligned with the "X" axis, as compared with the conventional camera attachment. Referring to FIG. 5 which additionally introduces an application of the present invention camera attachment, the shaft 212 is illustrated to be positioned in the arcuate recess 184 of the second top arcuate member 170. In that setting, the shaft 212 is aligned with the "X" axis of the three dimensional space if the angle mark "180" on the transverse rotatable member 120 is aligned with the "Y" axis, and the "Z" axis is vertical to the center of the transverse rotatable round member 120. Furthermore, in this setting, the pin 220 is positioned inside of the gap 148, as additionally illustrated in FIGS. 6 and 7, so that the pin 220 which is restricted by the gap 148 is prevented from having a further upward movement along with the "Z" axis. The restriction of the gap 148 provides a force, which is applied to the pin 220, to balance a heavy weight of the camera equipped with the long lens having the tripod collar, wherein the weight is applied to the camera mount 226. In this setting, the bearing 214 functions as a joint of leverage having one end which is the pin 220 and the opposite end which is the camera mount 226.

In this setting where the shaft 212 is positioned inside of the arcuate recess, the upper and lower fastener 200 and 204 can be maximumly loosened. Therefore, the universal joint 210 which is affixed to the shaft 212 can be freely rotatable relative to the "X" axis for the camera mount 226 which is attached with the camera equipped with the long lens having the tripod collar. It will be appreciated that the long lens of the camera is also positioned transverse to the shaft 212. Therefore, the long lens is rotating in the "YZ" plane when the universal joint 210 and shaft 212 are rotating along the "X" axis. With the above disclosed capability, the long lens can be affixed to any angular positions in the "YZ" plane after the rotation of the universal joint 210 is grasped due to a reduced size of the seat 208 which is achieved by tightening the fasteners 200 and 204.

The present invention has the above disclosed advantage of free rotation of the universal joint 210 while maintaining a balanced position for the camera which is aligned with the "X" axis. The advantage of the present invention is contrasted to a disadvantage of a limited ability of the "X" axial rotation for the conventional ball head 10, since it has to rely on a friction force which is applied to the ball head 10 to balance the weight of the camera equipped with the long lens when the short shaft 40 is positioned into the circumferential groove 60.

It will be appreciated that, the present invention camera attachment 100 provides a smooth rotation of the camera along the "X" axial direction, additionally due to a contribution of the bearing 214 which is concentrically affixed to the shaft 212 wherein the shaft is positioned inside of the arcuate recess 184. Therefore, the bearing 214 contacts the arcuate surface 186 of the arcuate recess 184 when the shaft 212 is rotated around the "X" axis. Application of the bearing 214 significantly reduces friction forces in rotation particularly in the situation when the rotation is loaded with the weight of the camera equipped with the long lens having the tripod. It will be further appreciated that, in addition to the bearing, application of the pin 220 also contributes to a reduced friction force. The result of the reduced friction forces from the present invention is a significant advantage, as compared with large friction forces in rotation which are generated from the conventional ball head 10 without having a bearing on its short shaft 40.

As illustrated in FIG. 4, the present invention shaft 212 of the camera attachment 100 has a sufficient length, so that the camera mount can be rotatably raised to align with the "Z" axis of the space, while the camera mount 226 is positioned within the "XY" plane. In that setting the camera mount 226 is positioned higher than the upper end 130 of the top arcuate vertical support 128. Therefore, the camera mount 226 is freely rotated along with the "Z" axis along with the camera, wherein the attachment 100 possesses the ability of the attitude rotation.

In addition, with the capability of the camera mount 226 which is able to rotated along with the "Z" and "X" axes, the camera mount 226 can be eventually rotated to any angular position in the three dimensional space, wherein the camera which is mounted on the camera mount also can be positioned to any location of the space from the present invention camera attachment having a very simple structure including the universal joint 210 which is combined with the shaft 212.

Furthermore, the present invention, which includes the transverse rotatable member 120 can also rotate on the "XY" plane, to thereby bring an additional convenience to control the position of the camera mount 226 in the three dimensional space.

It will be appreciated that the above illustration discloses the gap 148 which is positioned at the bottom side of the friction reduction member 154, wherein the friction reduction member 154 is attached to the first top arcuate member 142. However, it is within the spirit and scope of the present invention for the friction reduction member 154 and the first top arcuate member 142 to be integrated as one unit, which functions as a first top part of a housing means, wherein the gap 148 can be placed at the bottom of the integrated structure. Similarly, the upper and lower friction member 188 and 194 and the second top arcuate member 170 also can be an integrated structure, which functions as a second top part of a housing means. In addition, the gap 148 can be any types of structure so long as is functions as a housing for the pin 220 to serve as a restriction means, wherein the housing 148 can restrict a further upward movement of the pin 220. It will be further appreciated that, the shaft 212 can be an extension means having any kind of appropriate structure, which extends from the universal joint to connect to the camera mount.

In the above disclosure, the top arcuate vertical support 128, and the first and second top arcuate member 142 and 170 are illustrated in the arcuate shape for their ornamentation. However, it will be appreciated that they can be structure in any shapes including triangular, rectangular, cylindrical or even irregular shape, as long as they do not departed from their function to form the seat 208 of the universal joint 210, wherein the seat 208 is positioned above the transverse rotatable round member 120.

The present invention photographic instrument attachment 100 is made with durable metals or metal alloys, such as aluminum and aluminum alloys. In addition, the surface of the structural members of the attachment is treated with appropriate coatings, including those from chemical and electrochemical processes. However, the attachment 100, or at least the universal joint 210 can be made from nonmetallic materials, such as the material having the trade name Delrin, or a carbon fiber composite material.

It will be appreciated that the above disclosure introduces structural features of the present invention to support the long camera lens which is placed to no specific positions in the three-dimensional space. However, it is also possible for the present invention to locate the lens to specific locations by implementing additional structural features to the preferred embodiment 100 of the present invention.

Figure 8:
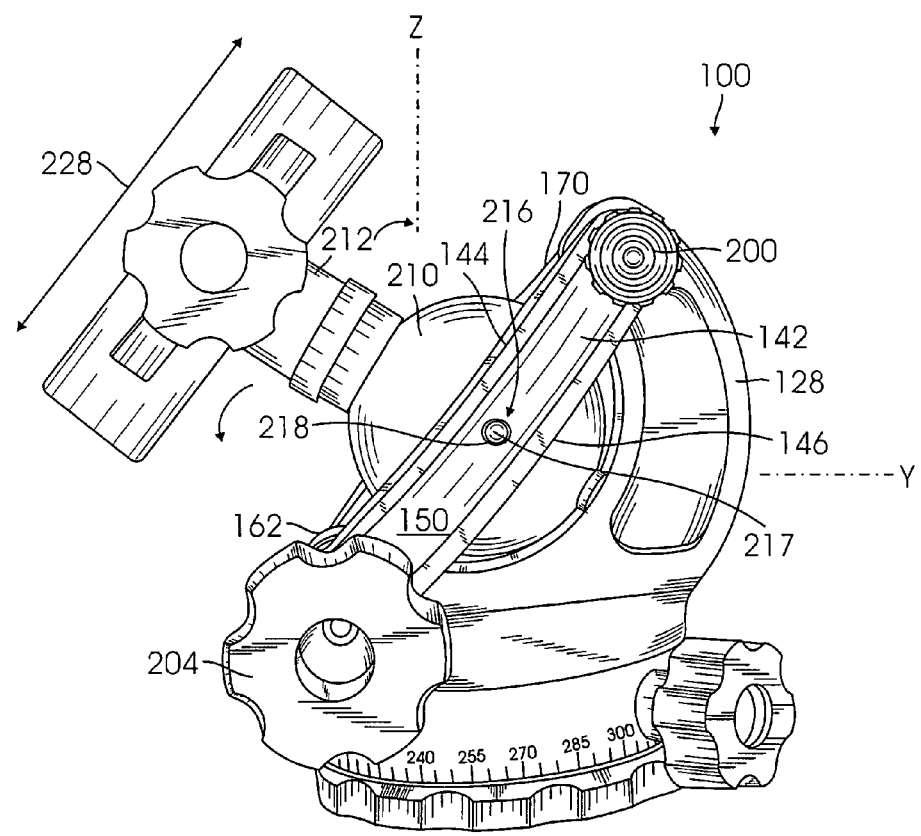
FIG. 8 is a side view of the preferred embodiment of the camera attachment to have an optional removable pin, wherein the pin which is aligned with the "X" axis of the camera attachment is removably penetrated through the center of the first top arcuate member and further through the diameter of the universal joint. Therefore the lens which is removably attached to the camera mount can rotate up and down around the removable pin in the "YZ" plane of the attachment.

As illustrated in FIG. 8, additional structural features are incorporated into the preferred embodiment 100, which make the long camera lens attached to the camera mount specifically rotate in the "YZ" plane. Referring to FIG. 8, there is illustrated an additional removable elongated pin 216 having an inner end and outer end 217. The inner end of the removable pin 216 penetrates through an opening 218 at the middle of the convex shaped outer surface 150 of the first top arcuate member 142. The opening 218 is further illustrated to be positioned in parallel to the top and bottom surface 144 and 146 of the first top arcuate member 142, and further to align with the arcuate recess 184 of the second top arcuate member 170.

In addition to the pin 216 and opening 218, it will be appreciated that a channel penetrates through a diameter of the universal joint 210. The channel is positioned according to a perpendicular spatial relationship to the shaft 212 and a camera lens orientation 228 where the camera lens is attached to the camera mount 226. In this setting, the opening 218 is aligned with the central channel of the universal joint 210. Therefore, the inner end of the removable pin 216 is able to penetrate through the opening 218 of the first top arcuate member 142, and the central channel of the universal joint 210 which is positioned inside of the seat 208. In this setting, the shaft 212 and the orientation 228 of the long camera lens are positioned in the "YZ" plane. Therefore, it will be appreciated that the camera lens can have a synchronized rotation with the rotation of the mount 226 around the removable pin 216 in the clockwise or counter clockwise orientation, as illustrated in FIG. 8 according to the respective arrows.

The difference of the lens rotation in FIG. 8 as compared to the lens rotation in FIG. 5 is that it not only changes an angle of the lens orientation 228 but also changes a height attitude of the lens in rotation which is attached to the camera mount 226. It will be appreciated that the lens will be positioned to the highest altitude when the camera mount 226 is rotated clockwise to the top of the attachment 100. In contrast, the lens is at the lowest altitude when the mount 226 is rotated counter clockwise close to the lower end 162 of the first top arcuate member 142. By fastening the upper and lower fastener 200 and 204, the camera mount 226 can be affixed to any positions after being rotated as discussed above. Therefore, this structural implementation brings a further flexibility for the lens which is positioned so that pictures can be taken according to both the different viewing angles and the different altitude positions of the lens.

Figure 9:
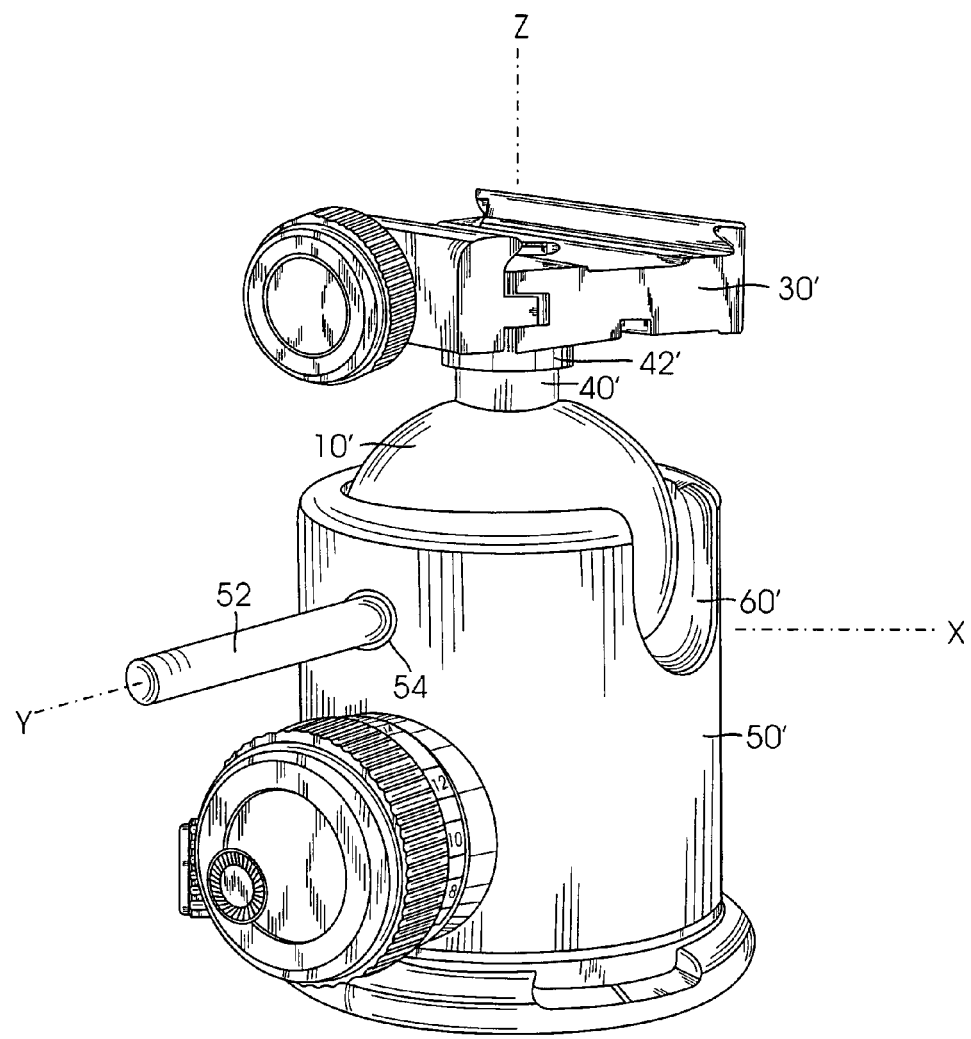
FIG. 9 is a perspective view of an improved conventional attachment, as compared with the conventional one which is illustrated in FIG. 3.

It will be appreciated that following the above illustrated mechanism, the conventional camera attachment which is illustrated in FIG. 3 can be structurally improved, wherein the improved attachment is illustrated in FIG. 9. The improvement is first from, addition of a bearing 42 onto the short shaft 40', so that it can reduce the friction force in rotation when the rotating shaft 40' is positioned into the recess 60' and aligned with the "X" axis of the three-dimensional system in space.

The improvement is also by addition of a set of structural members including (1) a removal elongated pin 52, (2) a central channel penetrating through a diameter of the ball 10', and (3) a front opening 54 and a rear opening on the cylindrical outer casing 50'. It will be appreciated that the central channel of the ball 10' is further positioned to align with the "Y" axis when the shaft 40' is aligned with "Z" axis, and a long camera lens which is attached to the camera mount 30' is also oriented to the "Y" axis. In this setting, the front opening 54 and the rear opening of the outer casing 50' are positioned to align with the central opening of the ball 10'.

In application of the attachment having the above illustrated three additional structural features, the removable pin 52 is inserted in to the rear opening of the cylindrical outer casing 50', after penetrating through the front opening 54 of the casing 50' and the central opening of the ball 10'. Therefore, the camera mount 30' can be rotated around the removable pin 52, wherein the camera lens is attached to the mount 30'. It will be appreciated that, with the aid of the conventional fastener of the attachment which is appropriately fastened, a sufficient friction force is applied to the ball 10' so that the camera mount 30' can be affixed to any positions after the above illustrated rotation of the camera mount relative to the pin 52. This structural improvement can make operation to position the camera lens quick and convenient, as compared with the conventional attachment shown in FIG. 3.

Defined in detail, the present invention is an attachment for a photographic instrument including a camera, comprising: (a) a bottom round base which is concentrically and rotatably connected to a transverse rotatable round member having a top vertical arcuate support, wherein the top vertical arcuate support is an arcuate shaped structure comprising an upper end and a lower end, the top arcuate vertical support at the lower end is connected to the transverse rotatable round member, wherein a projection of the upper end and lower end is aligned with a diameter of the transverse rotatable round member; (b) a first top arcuate member which is attached with a friction reduction member having a gap at its bottom side and an opening, a second top arcuate member, wherein the top arcuate vertical support of the transverse rotatable round member is connected to the respective transverse first and second top arcuate member, which forms a seat which functions as a housing of a universal joint, the second top arcuate member having an upper end and a lower end which are bridged by an arcuate recess; (c) a universal joint having a central channel, said universal joint is positioned inside of the seat is connected to a pin aligned with a diameter of the universal joint, and is further connected to one end of a shaft at an opposite side of the universal joint aligned with the diameter, wherein another end of the shaft is connected to a camera mount, a concentric bearing located on the shaft between the universal joint and the camera mount; (d) a removable channel; and (e) the shaft having the bearing is downwardly and rotatably positioned inside of the arcuate recess, accordingly the pin is upwardly positioned inside of the gap of the friction reduction member, wherein the gap prevents the pin from having a further upward movement, the pin, the universal joint, the shaft having the bearing and the camera mount constructing a leverage wherein the bearing functions as a rotational support to provide a smooth rotation of the camera mount, the pin functions as one end of the leverage which is positioned inside of the gap so as to apply a force to balance a weight of the camera which is attached to the camera mount, wherein the weight of the camera is applied to the camera mount to function as an opposite end of the leverage.

Defined broadly, the present invention is an attachment for a photographic instrument including a camera, comprising: (a) a transverse rotatable round member having a top vertical arcuate support, wherein the top vertical support is comprised of an upper end and a lower end, the top arcuate vertical support is connected to the transverse rotatable round member, wherein a projection of the upper end and lower end is aligned with a diameter of the transverse rotatable round member; (b) a first top arcuate member which is attached with a friction reduction member having a gap at its bottom side and an opening, a second top arcuate member having an arcuate recess, wherein the top arcuate vertical support of the transverse rotatable round member is connected to the respective first and second top arcuate member, which forms a seat as a housing of a universal joint; (c) a universal joint having a central channel, said universal joint is positioned inside of the seat is connected to a pin at one side of the universal joint, and is further connected to one end of a shaft at an opposite side of the universal joint, the opposite end of the shaft connected to a camera mount, a concentric bearing located on the shaft at a location between the ends of the shaft respectively connected to the universal joint and the camera mount; and (d) the shaft having the bearing is downwardly and rotatably positioned inside of the arcuate recess, accordingly the pin is upwardly positioned inside of the gap of the friction reduction member attached to the first top member, wherein the gap prevents the pin from having a further upward movement, which thereby balances a weight of the camera which is attached to the camera mount.

Defined more broadly, the present invention is an attachment for a photographic instrument including a camera, comprising: (a) a transverse rotatable round member having a top vertical support means, wherein the top vertical support means is comprised of an upper end and a lower end; (b) a first top part of a housing means having a gap and a second top part of the housing means having an arcuate recess; (c) a universal joint is connected to a restriction means at one side of the universal joint, and is further connected to an extension means at an opposite side of the universal joint, the extension means connected to camera mount at an end remote form the universal joint, and a concentric rotation means connected to the extension means; (d) means for combining the first and second top part and the top vertical support means to form a housing for the universal joint; and (e) the extension means having the concentric rotation means is downwardly and rotatably positioned inside of the arcuate recess, the restriction means is upwardly positioned inside of the gap of the first top part wherein the gap prevents the restriction means from having a further upward movement, and the rotation means provide a smooth rotation of the universal joint.

Defined even more broadly, the present invention is an apparatus to rotatably attach photographic equipment, comprising: (a) a ball head to rotatably support photographic equipment, the ball head rotatably supported in a casing having an exterior support base containing a groove therein; (b) the ball head including a shaft extending at one end from the ball head and terminating at a second end at a photographic support mount; (c) a rotatable bearing means on said shaft and located so that the bearing means is aligned with the groove when the ball head is rotated to enable the shaft to be positioned within the groove; and (d) the ball head having a restraining pin affixed at a location on the ball head opposite to and aligned with the shaft, the restraining pin received within a receiving means on a lower surface of the casing.

Defined most broadly, the present invention is an apparatus to rotatably attach photographic equipment, comprising: (a) a ball head to rotatably support photographic equipment, the ball head rotatably supported in a casing having an exterior support base containing a groove therein; (b) the ball head including a shaft extending at one end from the ball head and terminating at a second end at a photographic support mount; and (c) a rotatable bearing means on the shaft and located so that the bearing means is aligned with the groove when the ball head is rotated to enable the shaft to be positioned within the groove.

Defined alternatively, the present invention is an improvement for the conventional camera attachment having an outer casing having an arcuate recess, a ball head connected to a shaft which is further connected to a camera mount, the improvement comprising: (a) a bearing which is positioned to the shaft; (b) a removable pin; (c) a central channel of said ball head; and (d) a front and rear opening of said outer casing.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An attachment for a photographic instrument including a camera, comprising:
   a. a bottom round base which is concentrically and rotatably connected to a transverse rotatable round member having a top vertical arcuate support, wherein the top vertical arcuate support is an arcuate shaped structure comprising an upper end and a lower end, the top arcuate vertical support at the lower end is connected to the transverse rotatable round member, wherein a projection of the upper end and lower end is aligned with a diameter of the transverse rotatable round member;
   b. a first top arcuate member which is attached with a friction reduction member having a gap at its bottom side and an opening, a second top arcuate member, wherein the top arcuate vertical support of the transverse rotatable round member is connected to the respective transverse first and second top arcuate member, which forms a seat which functions as a housing of a universal joint, the second top arcuate member having an upper end and a lower end which are bridged by an arcuate recess;
   c. a universal joint having a central channel, said universal joint is positioned inside of the seat and is connected to a restriction pin aligned with a diameter of the universal joint, and is further connected to one end of a shaft at an opposite side of the universal joint aligned with the diameter, wherein another end of the shaft is connected to a camera mount, a concentric bearing located on the shaft between the universal joint and the camera mount;
   d. a removable pin; and
   e. the shaft having the bearing is downwardly and rotatably positioned inside of the arcuate recess, accordingly the restriction pin is upwardly positioned inside of the gap of the friction reduction member, wherein the gap prevents the restriction pin from having a further upward movement, the restriction pin, the universal joint, the shaft having the bearing and the camera mount constructing a leverage wherein the bearing functions as a rotational support to provide a smooth rotation of the camera mount, the restriction pin functions as one end of the leverage which is positioned inside of the gap so as to apply a force to balance a weight of the camera which is attached to the camera mount, wherein the weight of the camera is applied to the camera mount to function as an opposite end of the leverage.

2. The attachment in accordance with claim 1 wherein structural components of the attachment are made with metals or metal alloys.

3. The attachment in accordance with claim 1 wherein structural components of the attachment are chemically and electrochemically coated.

4. The attachment in accordance with claim 1, wherein structural components of the attachment are made of non-metal materials.

5. The attachment in accordance with claim 1, wherein said removable pin is inserted into said opening of said first top arcuate member and said central channel of said universal joint so that said camera mount is rotatable relative to said removable pin which is positioned transverse to rotating directions of said camera mount.

6. An attachment for a photographic instrument including a camera, comprising:
   a. a transverse rotatable round member having a top vertical support, wherein the top vertical support is comprised of an upper end and a lower end, the top vertical support is connected to the transverse rotatable round member, wherein a projection of the upper end and lower end is aligned with a diameter of the transverse rotatable round member;
   b. a first top member which is attached with a friction reduction member having a gap at its bottom side and an opening, a second top member having an arcuate recess, wherein the top vertical support of the transverse rotatable round member is connected to the respective first and second top member, which forms a seat as a housing of a universal joint;
   c. a universal joint is positioned inside of the seat and is connected to a restriction pin at one side of the universal joint, and is further connected to one end of a shaft at an opposite side of the universal joint, the opposite end of the shaft connected to a camera mount, a concentric bearing located on the shaft at a location between the ends of the shaft respectively connected to the universal joint and the camera mount; and
   d. the shaft having the bearing is downwardly and rotatably positioned inside of the arcuate recess, accordingly the restriction pin is upwardly positioned inside of the gap of the friction reduction member attached to the first top member, wherein the gap prevents the pin from having a further upward movement, which thereby balances a weight of the camera which is attached to the camera mount.

7. The attachment in accordance with claim 6 wherein the attachment is further comprised of a bottom round base which is concentrically and rotatably connected to the transverse rotatable round member.

8. The attachment in accordance with claim 6 wherein structural components of the attachment are made with metals or metal alloys.

9. The attachment in accordance with claim 6 wherein structural components of the attachment are chemically and electrochemically coated.

10. The attachment in accordance with claim 6, wherein structural components of the attachment are made of non-metal materials.

11. The attachment in accordance with claim 6, wherein said removable pin is inserted into said opening of said first top member and said central channel of said universal joint so that said camera mount is rotatable relative to said pin which is positioned transverse to rotating directions of said camera mount.

12. The attachment in accordance with claim 8 further comprising:
  a. a universal joint having a central channel; and
  b. a removable pin extending through the central channel of the universal joint.

13. The attachment in accordance with claim 8 wherein said removable pin is inserted into said opening of said first top member and said central channel of said universal joint so that said camera mount is rotatable relative to said pin which is positioned transverse to rotating directions of said camera mount.

\* \* \* \* \*